(12) United States Patent
Shaw et al.

(10) Patent No.: US 9,284,624 B2
(45) Date of Patent: Mar. 15, 2016

(54) PROCESS FOR RECOVERING ZINC AND/OR ZINC OXIDE II

(75) Inventors: Raymond Walter Shaw, Victoria (AU); Neal Barr, Auckland (NZ)

(73) Assignee: METALLIC WASTE SOLUTIONS PTY LTD. (AU)

( * ) Notice: Subject to any disclaimer, the term of this patent is extended or adjusted under 35 U.S.C. 154(b) by 126 days.

(21) Appl. No.: 13/988,911

(22) PCT Filed: Nov. 23, 2011

(86) PCT No.: PCT/AU2011/001507
§ 371 (c)(1),
(2), (4) Date: Mar. 31, 2014

(87) PCT Pub. No.: WO2012/068620
PCT Pub. Date: May 31, 2012

(65) Prior Publication Data
US 2014/0205519 A1 Jul. 24, 2014

(30) Foreign Application Priority Data
Nov. 23, 2010 (AU) ................ 2010905190

(51) Int. Cl.
C22B 19/34 (2006.01)
C22B 7/00 (2006.01)
C22B 7/02 (2006.01)
C22B 3/00 (2006.01)
C22B 19/00 (2006.01)

(52) U.S. Cl.
CPC ............ *C22B 19/34* (2013.01); *C22B 7/008* (2013.01); *C22B 7/02* (2013.01); *C22B 19/00* (2013.01); *C22B 19/24* (2013.01); *Y02P 10/234* (2015.11)

(58) Field of Classification Search
None
See application file for complete search history.

(56) References Cited

U.S. PATENT DOCUMENTS
5,667,553 A 9/1997 Keegel, Jr.

FOREIGN PATENT DOCUMENTS
WO   WO 9836102 A1 * 8/1998
WO   9848066 A1   10/1998

OTHER PUBLICATIONS

Wang, D.; "Recovery of Metals in Wastes"; Architectural Technique Communication; No. 1; p. 32-33; Jan. 1978; with English language translation.
International Search Report & International Preliminary Report on Patentability for International Application No. PCT/AU2011/001507 filed Nov. 23, 2011.
Abstract of Japanese Publication No. JP53050516A (Nippon Steel Corp.) May 16, 1976, 2 pgs.
Abstract of SU1680788A1 (Nizhegorod Poly) Sep. 30, 1991, 2 pgs.

\* cited by examiner

*Primary Examiner* — Melissa Swain
(74) *Attorney, Agent, or Firm* — Cantor Colburn LLP

(57) ABSTRACT

A process for recovering zinc from a zinc containing material, the process including the steps of: leaching the zinc containing material with an alkaline lixiviant comprising an aqueous mixture of $NH_3$ and $NH_4Cl$, or ionic equivalent, having a $NH_4Cl$ concentration of between about 10 g/L and about 150 g/L $H_2O$ and a $NH_3$ concentration of between 20 g/l $H_2O$ and 250 g/L $H_2O$, to produce a zinc containing leachate; stripping ammonia from the leachate to produce a stripped liquor which includes a zinc containing precipitate, the stripped liquor having a $NH_3$ concentration of between 7 and 30 g/L $H_2O$; and recovering the zinc from the stripped liquor.

19 Claims, 10 Drawing Sheets

PROCESS FOR RECOVERING ZINC AND/OR ZINC OXIDE II

CROSS-REFERENCE TO RELATED APPLICATIONS

This application is a U.S. national phase application filed pursuant to 35 U.S.C. §371 and claims benefit of PCT Patent Application No. PCT/AU2011/001507, filed Nov. 23, 2011, and Australian Patent Application No. 2010905190, filed Nov. 23, 2010.

FIELD OF THE INVENTION

The present invention generally relates to a process for the recovery of zinc preferably in the form of zinc or zinc oxide. The invention is particularly applicable for recovering zinc from Electric Arc Furnace dust ("EAF") and it will be convenient to hereinafter disclose the invention in relation to that exemplary application. However, it is to be appreciated that the invention is not limited to that application and could be used to recover zinc from a variety of sources including materials containing zinc oxide and other metal oxides, such as galvanisers' ash, oxidised ores, mineral processing residues, water treatment precipitates, contaminated soils, waste stock-piles and/or, solid waste streams, materials containing mixed-metal oxides including zinc where a "mixed-metal" oxide is a compound composed of zinc, oxygen and at least one other metal (e.g. zinc ferrite, or zinc ferrate) such as oxidised ores, or mineral processing residues.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Electric Arc Furnace dust ("EAF dust") is produced as fume from operating an electric arc furnace during steel making. This dust has to be collected and treated or disposed of in some way. Disposal of EAF dust by stabilization and burial is widely practiced. In many markets this is costly. Economic treatments to recover contained zinc in EAF dust has been a challenge to industry for many years.

A number of leach-recovery processes have been previously proposed to recover the zinc content from EAF type dust.

U.S. Pat. No. 3,849,121 (Burrows) teaches a method for the selective recovery of zinc oxide from industrial waste in which the waste material is leached with an ammonium chloride solution at elevated temperatures to provide a pregnant leach solution. Other metals such as iron are separated out using oxidative treatments and a zinc metal cementation step. The solution is then cooled to precipitate a mixed zinc compound which includes small amounts of zinc oxide, hydrated zinc phases which can include hydrates of zinc oxide and zinc hydroxide, as well as other phases and a large amount of zinc dichlorodiammine $Zn(NH_3)_2Cl_2$ and other similar zinc-chlorine compounds. This product requires further processing to provide a commercially viable product.

U.S. Pat. No. 5,464,596 (Myerson 1) teaches an alternative method for the recovery of zinc oxide. In this method, EAF dust is leached with a lixiviant comprising 23% ammonium chloride at 90° C. The resultant pregnant liquor is treated to displacing undesired metal ions from the solution using zinc metal, and then cooled to precipitate out zinc compounds as a zinc dichlorodiammine (ZDC) crystal precipitate. The precipitate is washed to remove various soluble zinc compounds, leaving zinc oxide of greater than 99%. U.S. Pat. No. 5,759,503 (Myerson 2) teaches an improved process over Myerson 1 in which the recovery of zinc oxide from the pregnant liquor is improved by dissolving zinc oxide in an intermediate, diluting the intermediate by a factor of 3 to 30 by adding 70 to 100° C. water, and filtering out the resultant zinc oxide crystals.

None of these prior zinc recovery processes have been successfully commercialized. It is considered that the operating costs for each of these processes are high due to the need for large quantities of energy and/or the use of large quantities of sodium hydroxide in the recovery process. There may also be problems with product purity due to the presence of residual chloride from the leach process.

The main energy consumer in these prior processes is water evaporation steps which regenerate the leach solution for recycle. Substantially all of the water added for dilution and/or in hydrolysis has to be removed from the process circuits of these prior processes. The amount of water involved can be as high as 40 tonnes of water per tonne of zinc oxide. Evaporative water processes are necessary because of the high ionic strength of the concentrated solutions. These concentrations provide limited scope to use the lower energy reverse osmosis systems. Evaporative process steps are not economically attractive in a high energy cost environment.

Alternative processes which use less process water have been proposed to extract metallic products such as zinc from smelter dust.

U.S. Pat. No. 5,234,669 (Bartlett) describes a process for recovering non-ferrous metals from smelter flue dust in which smelter dust is mixed with hydrated lime, formed into agglomerates, and roasted at an optimal temperature of about 650° C. to form oxidized arsenic and sulfur which react with the lime in the agglomerates to form non-leachable compounds. The roasted agglomerates are contacted with a basic lixiviant comprising dissolved ammonia and an ammonium salt, such as ammonium chloride, to dissolve non-ferrous metals such as copper from the roasted agglomerates. The resulting pregnant leach solution is heated to vaporise the ammonia and precipitate basic compounds of copper, zinc and nickel therefrom. One lixiviant used is disclosed as comprising 4 M ammonia and between 1 to 4 M ammonium chloride. No further process steps are taught to refine this precipitate to a useable industrial product.

European patent publication EP061477A1 (Scegi SARL) teaches another a process for recovering non-ferrous metals from smelter flue dust in which the smelter flue dust undergoes ammoniacal leaching with an ammoniacal lixiviant at a temperature of between 20 to 100° C. The ammoniacal lixiviant is a 0.5 to 10 moles/liters solution of $NH_3/NH_4Cl$, $NH_3/(NH_4)_2SO_4$, or $NH_3/(NH_4)_2CO_3$. One particular lixiviant taught comprises 17 g/l ammonia and 53 g/l ammonium chloride having a temperature of between 20 to 40° C. After leaching, the undissolved residues are separated from the pregnant leach solution. Ammonia is then desorbed from the pregnant leach solution using an air stream to lower the pH of the solution from between 9 and 10 to between 4 and 7. Ammonia desorption leads to the direct formation of a metallic precipitate of hydroxide. The hydroxide can then be dehydrated after washing, using any conventional manner, to obtain metal oxide of a high purity (~98%). No detailed process steps are taught to refine this precipitate to a useable industrial product.

Each of Bartlett and Scegi SARL provide general guidance in appropriate leaching conditions to solubilise the zinc content of smelter flue dust. However, neither provides suitable guidance in the extraction conditions or process steps in obtaining a usable industrial zinc product.

It would therefore be desirable to provide an improved or at least alternative process which leaches and solubilises zinc from a variety of sources of zinc containing materials associated with other metal oxide(s) and/or "mixed-metal" oxides. This method preferably produces zinc oxide using ammonium chloride based leach liquor using a process that has a lower energy usage than prior processes but can also produce a fed material suitable for further processing to produce zinc metals and/or other zinc compounds.

It should be understood that any metal such as zinc, manganese, lead etc should be understood to include any chemical form (i.e. metal, salts, complexes, chelates, etc) or ionic form.

It is also to be understood that all the concentrations used in this specification are based around $g/KgH_2O$ or $g/L\ H_2O$ and not g/L of actual liquor volume. It is to be appreciated that g/l of actual liquor volume does not really reflect the chemistry of the process of the present invention as the $NH_3$ and high levels of salts all affect the volume especially the $NH_3$ when present at high values.

SUMMARY OF THE INVENTION

According to a first aspect of the present invention, there is provided a process for recovering zinc from a zinc containing material, the process including the steps of:

leaching the zinc containing material with an alkaline lixiviant comprising an aqueous mixture of $NH_3$ and $NH_4Cl$, or ionic equivalent, having a $NH_4Cl$ concentration between 10 and 150 g/L $H_2O$ and a $NH_3$ concentration of between 20 g/l $H_2O$ and 250 g/L $H_2O$, to produce a zinc containing leachate;

stripping ammonia from the leachate to produce a stripped liquor which includes a zinc containing precipitate, the stripped liquor having a $NH_3$ concentration of between 7 and 30 g/L $H_2O$; and recovering the zinc from the stripped liquor.

The process of the present invention therefore uses an alkaline ammonium based lixiviant to selectively leach the zinc from the zinc containing material. The overall process predominantly leaves zinc in solution in the resultant leachate. By particular selection of lixiviant composition and particular control of the ammonium stripping step, a zinc solution can be produced that can have the zinc solubility modified by ammonia stripping to a selected ammonia concentration and pH that facilitates recovery of a substantial portion of the contained zinc as basic zinc compounds leaving a zinc depleted ammonium chloride liquor for recycle.

The applicant has discovered that the particular formulation of lixiviant used in the leaching step of the process of the present invention and the particular stripping conditions results in an advantageous zinc precipitate composition in the stripping step, whilst leaching the zinc of a zinc containing material (mainly ZnO) in high enough zinc concentrations to be economically viable. The low $NH_4Cl$ concentration (compared to prior $NH_4Cl$ leaching systems) used in the lixiviant of the leaching step produces a substantially ammonia free precipitate from the stripping step. Furthermore, the resulting stripped liquor pH and $NH_3$ concentration create the appropriate equilibrium conditions within that liquor to precipitate desirable basic zinc compound or mixture of compounds. The process can therefore reduce the use of, or avoid the use of NaOH and/or dilution water additions to assist in recovering the zinc from the stripped liquor.

The process of the present invention aims to reduce, and more preferably substantially avoid the formation of zinc dichlorodiammine (ZDC) crystal precipitate after ammonia stripping. This is achieved using a $NH_4Cl$ concentration in the lixiviant of between 10 g/L $H_2O$ and 150 g/L $H_2O$. To ensure ZDC crystal formation is substantially avoided, it is preferred that the $NH_4Cl$ concentration used in the lixiviant is between 20 g/L $H_2O$ and 100 g/L $H_2O$, preferably between 30 g/L $H_2O$ and 80 g/L $H_2O$, and most preferably about 50 g/L $H_2O$.

The concentration of $NH_3$ in the lixiviant is selected to optimize the solubility of zinc in the lixiviant to both extract it from the feed dust and to minimise the cost of subsequent processing. The concentration of $NH_3$ in the lixiviant is preferably between 20 g/l $H_2O$ and 150 g/L $H_2O$, more preferably between 30 and 100 g/L $H_2O$, yet more preferably about 75 g/L $H_2O$ and even yet more preferably about 50 g/L $H_2O$. The $NH_3$ content improves the solubility of that zinc content above that found in the $NH_4Cl$ leach system for $NH_4Cl$ concentrations between 10 g/l $H_2O$ and 150 g/l $H_2O$, and thereby provides a more efficient leaching system.

The aqueous $NH_3/NH_4Cl$ lixiviant composition can comprise any suitable alkaline solution which includes an ammonium species, a hydroxide species and a chloride species, and in particular ionic forms of those species. It should be understood that the lixiviant could be formed using ionic equivalent salts such as $NH_4OH/NH_4Cl$ mixtures and that these ionic equivalents are intended to be covered in the scope of the present invention.

The lixiviant has a pH>7. An alkaline lixiviant is less conducive to iron solubilisation and minimizes lead and manganese solubilisation. The addition of ammonia and/or ammonium hydroxide should be sufficient to make the lixiviant alkaline in terms of normal aqueous chemistry. The ammonia stripping step is preferably conducted to ensure that the ammonia concentration is not reduced to a level in which the pH of the stripped liquor is less than 7. The amount of free ammonia available in the solution for removal is dependent on the pH. As the ammonia is stripped to take the pH below 7 selective removal of ammonia is very difficult and energy inefficient and is therefore not preferred. Stripping the ammonia to this level can also cause considerable water to also evaporate which increases the energy use. These conditions also increase the concentration of $NH_4Cl$ such that the undesirable zinc diammine chloride crystals can form.

The leach efficiency with this lixiviant has been found to have a low dependence on $NH_4Cl$ concentration. Leach efficiency rather requires time to maximize extraction. Two or more leach stages are therefore preferably used to maximise solids contact time in the leach, to ensure a higher extraction of zinc into the leachate. In a preferred embodiment, the leaching step comprises a two stage leach. Each leach stage is preferably agitated.

Prior to the leaching stage, the zinc containing material can undergo a preliminary leaching stage where the zinc containing material is leached with water. This step is conducted to remove unwanted soluble impurities such as chlorides and alkali metals.

The leaching step produces a zinc rich leachate that can have its zinc solubility modified by ammonia stripping. The step of stripping ammonia from the leachate precipitates out basic zinc compounds producing a stripped liquid containing solid zinc product. A substantial portion of the contained zinc can be recovered as basic zinc compounds leaving a zinc depleted ammonium chloride liquor for recycle. The process can then include the step of removing solids from the stripped liquid which can then be recovered. Advantageously, no additional evaporation steps are required to remove additional water as no water dilution additions have been made in the process.

The stripping step may only strip a proportion of the ammonia from the leachate. However, it is preferred that the majority of the $NH_3$ is stripped out of the leachate in the stripping step to produce a precipitate comprising most of the zinc that was in the leach liquor in a substantially ammonia free zinc compound. The $NH_3$ concentration after stripping is between 7 and 30 g/L $H_2O$ and preferably ~10 g/L $H_2O$. Where most of the $NH_3$ is stripped out of the leachate, the zinc is precipitated in the stripped liquor in the form of at least one or a combination of zinc hydroxide ($Zn(OH)_2$), zinc hydroxy chloride ($Zn_5(OH)_8Cl_2.H_2O$), or zinc oxide (ZnO). For subsequent processing, it is preferred that the process is optimised to produce a low chloride compound as is practical within the constraints of the chemical compositions needed to undertake the leach step efficiently.

Ammonia stripping can be performed by any number of processes.

In one embodiment, the ammonia stripping step includes an air stripping step. The air stripping step preferably includes at least one vessel in which an air stream is fed over or through the zinc containing leachate to vaporise or otherwise remove a portion of the ammonia content of that leachate.

In some embodiments, two or more air stripping process steps are used in series. In this embodiment, it is preferred for the air stream and zinc containing leachate to flow through the process steps (in particular, the process vessel or vessels of each step) in a counter current flow. The zinc containing leachate may be continually heated in one or more of the strip vessels of the process steps. Heating may be achieved using an internal heating element, or more preferably an external heat exchanger. The heat exchanger can be heated using oil or steam from a boiler arrangement where the energy is supplied by a fossil fuel such as natural gas, or by electric heating, or where appropriate using renewable heat from a solar or geothermal source. In some cases, part or all of the heat can be supplied by capturing waste heat from a furnace such as an electric arc furnace or a slag fuming furnace. In some embodiments, the ammonia/water rich air that flows from the zinc containing leachate is then passed through an absorption column where the ammonia and water are substantially separated from the air stream. The resulting scrubbed air stream is preferably recycled back into one or more of the strip vessels. The system is preferably operated as a closed loop arrangement.

In another embodiment, the ammonia stripping step includes a flash step in which a heated and pressurised leachate is fed into a flash vessel to flash off a mixed ammonia-water vapour stream leaving a supersaturated zinc liquor from which the zinc compounds precipitate.

Crystallisation of the zinc compounds can occur insitu, within the strip vessels or in a separate crystallisation vessel/stage. Crystals of zinc compounds can be added to this stage to assist in precipitation by providing surface for the compounds to grow upon by either recycling crystals and/or retaining some in the system from previous batches.

In some embodiments, the precipitation of the zinc containing precipitate is conducted in a separate vessel after the ammonia stripping either directly or with the help of some deliberate cooling of the liquor. The amount of cooling depends upon the solution composition and is not always necessary as many of the compositions used have only small solubility changes with temperature. The zinc precipitate is typically formed in crystal form, and therefore the process may include a crystal growth step, such as an agitated tank or similar.

A number of the process streams from the stripping step can be recycled back into the process. For example, water removed from the stripping step can be recycled in at least one washing or filtering step. The stripped ammonia can be captured for recycle to the leaching step. The zinc depleted liquor can be directly recycled back to the leaching step and/or part can be recycled back to the stripping stage to modify the composition of the liquor to improve $NH_3$ removal.

Following the stripping step, the recovering steps may include the steps of:

separating the zinc containing precipitate from the stripped liquor; and preferably washing zinc containing precipitate.

This step removes any ammonia present as traces of zinc dichlorodiammine (ZDC) crystals and/or as ammonia containing liquor entrapped in the precipitate. An ammonia free precipitate can give high yields of zinc oxide because the chloride containing compounds within them can be decomposed to yield predominantly zinc oxide with a lesser amount of zinc chloride which can be separated and then recycled or sold. The washing step is preferably conducted with minimal water usage to limit the amount of water used in the process.

The step of recovering the zinc(s) with this type of intermediate precipitate product can proceed along various different process steps to convert the zinc containing precipitate into a low chloride product.

In one embodiment, the step of recovering the zinc includes the step of roasting the zinc containing precipitate to a temperature of between 600 to 900° C. The roasting step preferably occurs in a furnace. Roasting between these temperatures substantially converts the product to zinc oxide. Furthermore, any chloride content of the zinc containing precipitate is volatised at this temperature predominantly as $ZnCl_2$, thereby giving a low chloride high purity product. While higher temperatures speed up the volatilization, the final roasting temperature depends mainly on the economics at any specific installation. It should however be appreciated that removal of chlorides to <0.35% Cl in the end product typically involves roasting the zinc containing precipitate to temperatures in the order of 700 to 800° C.

In another embodiment, the step of recovering the zinc includes the steps of:

hydrolysis of the zinc containing precipitate in water having a temperature of between 80 to 200° C., preferably between 100 to 140° C.

Preferably, a high solids loading (>40%) is used, enabling a low (modest) amounts of water to be used for hydrolysis.

Hydrolysis of the zinc containing precipitate may substantially convert any zinc hydroxy chloride content to zinc hydroxide, zinc oxide or a mixture thereof. Hydrolysis of the zinc containing precipitate in hot water between 80 to 200° C. substantially converts any zinc hydroxy chloride content to zinc oxide and/or zinc hydroxide. Hydrolysis preferably achieves a product having a low total and insoluble chloride levels achieved (<0.5%).

After hydrolysis, the hydrolysis product is preferably filtered and cooled. The chloride content of the hydrolysis water can be substantially removed using a separation process, such as reverse osmosis, and the purified water and chloride content recycled in the process. For example, the chloride may be used in the leaching step. The hydrolysis product is preferably dried to remove water at a temperature of <200° C. to give a ZnO product.

Where a higher purity product is required, the hydrolysed zinc containing precipitate can be subsequently roasted to produce zinc oxide. In these embodiments, the step of recovering the zinc includes a further roasting step in which the zinc containing precipitate is roasted to between 300 to 900° C., preferably between 400 to 800° C. and most preferably between 500° C. and 800° C. A lower temperature roast may be used if substantially all of the chloride content is removed in the hydrolysis step.

The water from hydrolysis typically contains zinc. At least a portion of the water from the hydrolysis step can be separated and either recycled to the leach or treated to recover the zinc content. Preferably, the water is concentrated to produce a concentrated liquor. This concentrate can be recycled to the leach step. The water is preferably processed and/or concentrated using reverse osmosis to give a clean water stream for recycle or discharge and a more concentrated stream containing chlorides which can be recycled into the process most commonly into the leach or treated and discharged. Again, evaporative processes are ideally avoided given the large amount of energy involved in these processes. Where the concentrated stream is treated rather than recycled, the favoured option is to treat it with NaOH to precipitate any zinc content for recycle into the process as a solid. Ideally the hydrolysis step removes all of the chloride compounds from the zinc containing precipitate. However, if this is not achieved, final chloride traces in the precipitate can be removed by roasting the hydrolysed zinc containing precipitate at temperatures between 500 to 800° C.

In yet another embodiment, the step of recovering the zinc includes the steps of:

a first roasting step in which the zinc containing precipitate is roasted at a temperature of between 300 to 500° C.; and a second roasting step in which the roasted solids are further roasted between 300 to 900° C., preferably between 400 to 800° C.

In some embodiments, after the first roasting step, the roasted zinc containing precipitate undergoes a leaching step with water to produce a leached solid.

The first roasting step in this embodiment decomposes the chloride compounds into ZnO and $ZnCl_2$. The soluble chloride compounds (mainly $ZnCl_2$, though some HCl is possible) are then substantially removed in the aqueous leach. Any traces of chloride left can then be removed through further, preferably higher temperature roasting step. This step also converts the zinc containing compounds in the leached solids to ZnO. The double roasting regime enables less water to be used to remove the chloride content in comparison to the previous recovery option as $ZnCl_2$ is extremely soluble. The added water is preferably recovered and recycled in the process.

In another embodiment, the step of recovering the zinc includes the step of: roasting the zinc containing precipitate in a steam atmosphere at around a temperature of between 350 to 500° C.

This process step is preferably undertaken at moderate pressure of between 1 to 5 bar. This process aims to decompose the zinc hydroxy chloride into ZnO and $ZnCl_2$ and to hydrolyse the $ZnCl_2$ in situ to convert it to ZnO. Any chloride content can be removed as HCl. The added water resulting from the steam is preferably recovered and recycled in the process.

In any of these zinc recovery steps, $ZnCl_2$ is volatised in the roasting step. Each of these processes can further including at least one the steps of condensing the $ZnCl_2$ and separated for sale as anhydrous $ZnCl_2$, and/or capturing the $ZnCl_2$ into an aqueous liquor and recycling this liquor to a preceding process step. This $ZnCl_2$ rich liquor can be preferably recycled the crystallisation step or the leach step.

The "zinc containing material" can be any material including material containing zinc species are such as:

i. Materials containing zinc oxide and other metal oxides such as galvanisers' ash, EAF dust, oxidised ores, mineral processing residues, water treatment precipitates, contaminated soils, waste stock-piles, or solid waste streams.

ii. Materials containing mixed-metal oxides including zinc where a "mixed-metal" oxide is a compound composed of zinc oxygen and at least one other metal (e.g. zinc ferrite, or zinc ferrate, such as EAF dust, oxidised ores or the like;

iii. Materials arising from furnace treatment of zinc containing materials such as arise from treating EAF Dust in Waelz kilns or other furnaces iv. Materials obtained from treating mixed metal oxides such as zinc ferrite in furnaces to disrupt the structure and improve the leaching characteristics v. Mineral processing residues.

In preferred embodiments, the zinc containing material is substantially particulate.

Recovery of the zinc from the leachate preferably includes one or more process steps which separate solids from the leachate, removal procedures for other metal species which may be present in the leachate such as lead, manganese, copper and cadmium and/or process steps to separate the zinc from the leachate.

The separation of solid and liquid elements in the process can be performed using any suitable method. For example, in some embodiments the process includes at least one filtering step to remove solids from the leachate.

The zinc containing material may also include at least one of manganese, lead, copper or cadmium. Other trace elements, species or impurities may also be present. The process of the present invention therefore can include steps of removing any lead, manganese, copper or cadmium from the leachate.

Where the zinc containing material includes lead, this can be removed using selective removal processes. Firstly, it should be appreciated that lead (II) is leached in the leaching step while lead (IV) is not leached and typically only a very small amount of lead is dissolved into the lixivant. The lead leached from the zinc containing material is preferably returned to the leached solids by oxidation to an insoluble form.

Controlled oxidation preferentially oxidizes any lead in the lixivant before any manganese which may be present in the zinc containing material. Thus, any lead can be isolated before manganese. If required the lead removal step is preferably conducted prior to any solids/liquid separation of leachate after the leaching step. However, in some embodiments, lead can be removed and separated after a liquid solids separation step and collected separately.

Where the zinc containing material includes manganese, this can be removed using selective removal processes. Firstly, it should be appreciated that manganese in oxidation states less than +4 is leached in the leaching process but manganese (IV) is not leached and typically only a small amount of manganese dissolves into the lixivant. The manganese leached from the zinc containing material is preferably returned to the leached solids by oxidation to an insoluble form.

If required the manganese removal step is preferably conducted prior to any solids/liquid separation of leachate after the leaching step. However, in some embodiments, manganese can be removed and separated after a liquid solids separation step and collected separately. Again, it is preferable to conduct the controlled oxidation of lead prior to manganese so lead can be optionally isolated before manganese then removed and manganese subsequently oxidized to manganese dioxide and separated.

Each of the lead and manganese removal steps can comprise chemical oxidation using one of peroxide or chlorine and/or chloride based oxidants such as hypochlorite or chloramine. Air oxidation may also be used to remove these metals. Alternatively, electrochemical oxidation may also be used.

Where the zinc containing material includes copper and cadmium, these can be removed by the well-established process of cementation on zinc. The manganese leached from the zinc containing material is preferably removed using a cementation process which includes the step of adding zinc metal to the leachate. This step can also remove traces of lead and may be used for lead removal instead of, or in addition to, the oxidative step described previously.

The lead, manganese, copper and/or cadmium could also be removed by electrolytic means. Such electrolytic processes can be combined or consecutive or a combination of combined and consecutive.

In a second aspect of the present invention, there is provided a plant which includes a process according to the first aspect of the present invention. This plant preferably includes a sealed vessel which may comprise a pressure vessel able to present the lixiviant solution and particulate material(s) to ammonia saving confinement for the purpose of the leaching out of the zinc. It should be appreciated that at 40° C. there is little/no pressure but there is a need to confine the gaseous $NH_3$ because it has substantial vapour pressure and it is preferable not to lose any gaseous $NH_3$.

The present invention also provides a zinc containing material produced from a process according to the first aspect of the present invention.

BRIEF DESCRIPTION OF THE DRAWINGS

The present invention will now be described with reference to the figures of the accompanying drawings, which illustrate particular preferred embodiments of the present invention, wherein.

DETAILED DESCRIPTION

Figure 1:
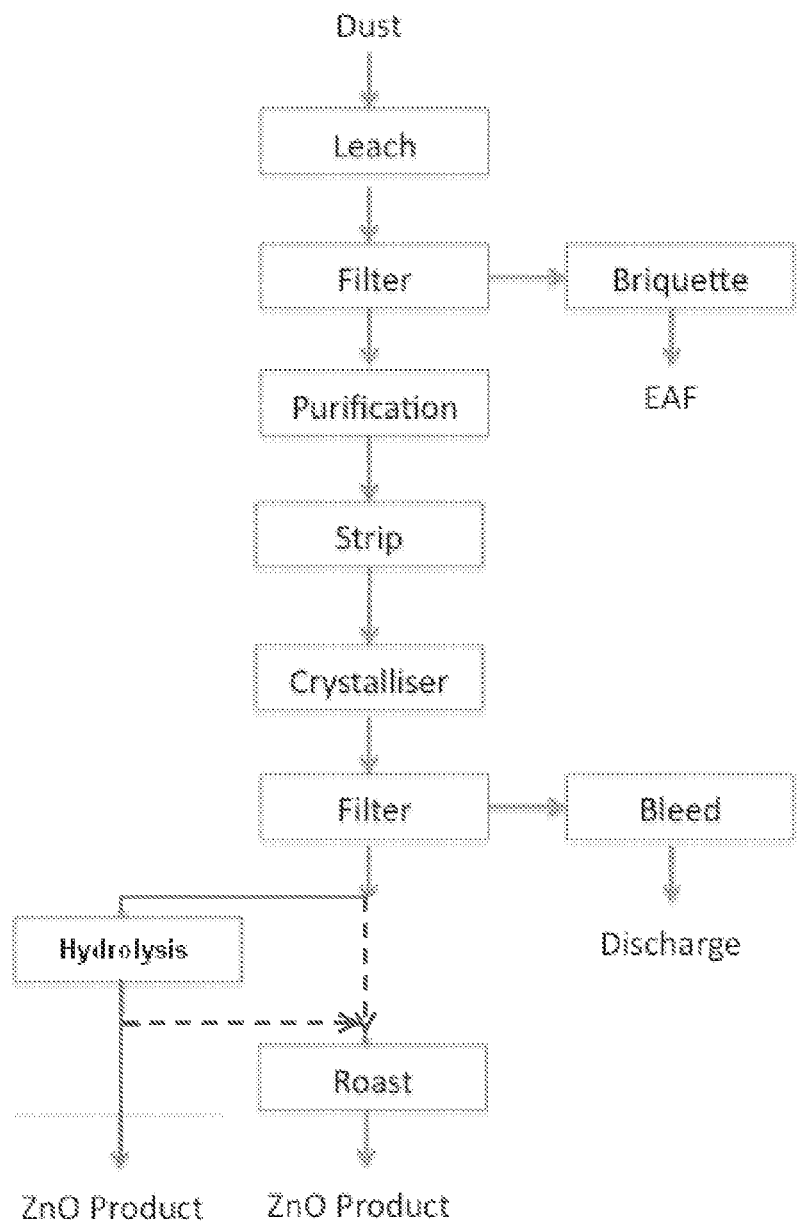
FIG. 1 is a general flow diagram showing the process steps for one preferred embodiment of the process according to the present invention.

The process of the present invention relates to the recovery of zinc from a zinc containing material. The "zinc containing material" can be any material including material containing zinc species are such as galvanisers' ash, EAF dust, oxidised ores, mineral processing residues, water treatment precipitates, contaminated soils, waste stock-piles, or solid waste streams. Such zinc containing material typically also includes manganese, lead, copper and cadmium which can also be solubilised in a lixiviant applied during a leaching step.

Without wishing to be bound by any one theory, the applicant has designed the leaching and step of recovering the zinc of the process of the present invention to take advantage of the equilibrium which is established between the soluble and insoluble metal complexes of the oxides and mixed metal oxides in such a zinc containing material when leached by a lixiviant. The particular lixiviant of the present invention provides a mix of ligands which facilitate this equilibrium. Ammonia, ammonium chloride, hydroxide and water are all available for metal complex formation.

The applicant has found that the intermediate precipitate formed during the ammonia stripping step is substantially dependant on the composition of the lixiviant used in the leaching step. The particular lixiviant formulation used in the leaching step of the present invention comprises an ammonia concentration of between 20 g/l $H_2O$ and 150 g/L $H_2O$ and a low $NH_4Cl$ concentration (less 150 g/kg $H_2O$, preferably less than 130 g/kg $H_2O$ and more preferably less than 100 g/kg $H_2O$) leads to zinc hydroxy chloride ($Zn_5(OH)_8Cl_2.H_2O$), and zinc hydroxide ($Zn(OH)_2$) being predominantly precipitated when a selected ammonia content of the resulting leachate is stripped from solution. It should be appreciated that an amount of zinc oxide (ZnO) can also be produced. This intermediate precipitate composition enables a final ZnO product to be produced using much lower energy than has traditionally been possible in prior zinc recovery processes.

High concentration $NH_4Cl$ lixiviants used in prior processes all give zinc dichlorodiammine (ZDC) crystals as the intermediate precipitate unless diluted with additional water. This is consistent with published chemistry that cites that at >3M Cl ~$NH_4Cl$ at 165 g/kg $H_2O$ the crystals are always ZDC. However, such an aqueous dilution step requires a large amount of water to be added to the process which must be subsequently removed. This adds a significant energy loading to this type of zinc recovery process. A zinc dichlorodiammine (ZDC) intermediate is also more difficult to process as it is an unsuitable roasting precursor for ZnO. ZDC decomposes to $NH_3$ and $ZnCl_2$ rather than ZnO when roasted at temperatures between 300 and 900° C. The thermal decomposition of ZDC is a well-known method of producing anhydrous $ZnCl_2$.

The addition of the $NH_3$ to the lixiviant enables these lower $NH_4Cl$ levels to be used as it improves the solubility of zinc such that the leach liquor can leach the zinc from the EAF dust or other source without needing excessive volumes of liquor and the zinc can then be precipitated out without the need to cool the leach liquor to very low temperatures to drop the solubility.

FIG. 1 shows the general flow diagram of the process according to the present invention for producing zinc oxide from EAF dust. EAF dust typically includes zinc, manganese, lead, copper and cadmium. Other trace elements may also be present.

In the first step illustrated in FIG. 1, the EAF dust is leached with an alkaline lixiviant comprising an aqueous mixture of ammonium chloride and ammonia. The leach is conducted as a two stage counter current leach. The lixiviant composition is preferably ~50 g/L $NH_4Cl$ liquor containing ~50 g/L $NH_3$. However, it should be appreciated that a large number of other concentrations could also be used within the scope of the present invention. The maximum $NH_4Cl$ level is determined by the need to substantially avoid ZDC crystal formation. Additionally, the applicant has found that the solubility of the zinc in this lixiviant depends on the $NH_4Cl$ and $NH_3$ concentrations but these have minimal impact on the total zinc extracted. The concentration of $NH_3$ in the lixiviant is therefore selected to optimize the solubility of zinc in the lixiviant and to minimise the energy needed to strip the $NH_3$ and precipitate the zinc compounds.

The two stage leach system is considered to provide a zinc extraction in the order of 80 to 85%. However, it should be appreciated that the exact extraction is dependent on the composition of the EAF dust used in the process. A zinc yield across leaching is typically in the order of 20 to 50 g/L based on the solubility range as the ammonia is removed and the zinc compounds precipitated. Each leaching stage is agitated, typically conducted in a stirred vessel. The applicant has found that these particular leaching conditions are not substantially temperature dependent. Each leach stage can therefore be conducted at room temperature (10 to 35° C.) if desired. In practice, the leaching stage is run at between 30 to 90° C., preferably about 60° C. for circuit heat balance considerations.

The leaching step produces a pregnant liquor substantially including the zinc with small amounts of solubilised manganese, lead, copper and cadmium. A leached solid content is also present.

The pregnant liquor is then separated from the leached residue in a filter and/or thickener system to produce a high zinc content pregnant liquor. The clarity of the pregnant liquor is important in minimizing the loads on subsequent filtering stages, for example a filter after cementation (discussed below). Flocculent additions may therefore be needed to remove any fine particles in the leachate. The solid leached residue is washed and then briquetted for return to the EAF. The filtrate from the residue filter and wash water can be recycled and mixed into the EAF dust for use in the first stage of the leaching step.

The resulting pregnant liquor typically undergoes purification processes to remove other solubilised metals. In the purification process, the pregnant liquor may be passed through a controlled oxidation step to remove the lead and manganese from the liquor, or may be fed directly to a cementation step where the copper and cadmium are removed by cementation on zinc. In the cementation process, the pregnant liquor is mixed with zinc powder typically (0.2 to 2 g/L) to remove soluble metals, especially copper, which is detrimental to the product in the ceramics market. After cementation the slurry is filtered on a fine pressure filter to remove the unreacted zinc, the metallic impurities, and colloidal particles which remain from the leach circuit.

The resultant liquor now predominantly includes the zinc in solution. The solubility of the zinc in solution is dependent on the amount of ammonia present in the liquor. The ammonia concentration can therefore be reduced to force the zinc containing crystals to precipitate. This is achieved in the present process in the strip step (FIG. 1) where an ammonia content of the pregnant liquor is stripped using heat and/or air and/or vacuum.

In one process route, the zinc rich pregnant liquor is passed into a hot ammonia stripping step. In this step, a heating system is used to pressurize and heat (typically between 80° C. and 130° C.) the pregnant liquor, which is then fed into a strip vessel (not illustrated).

Figure 2:
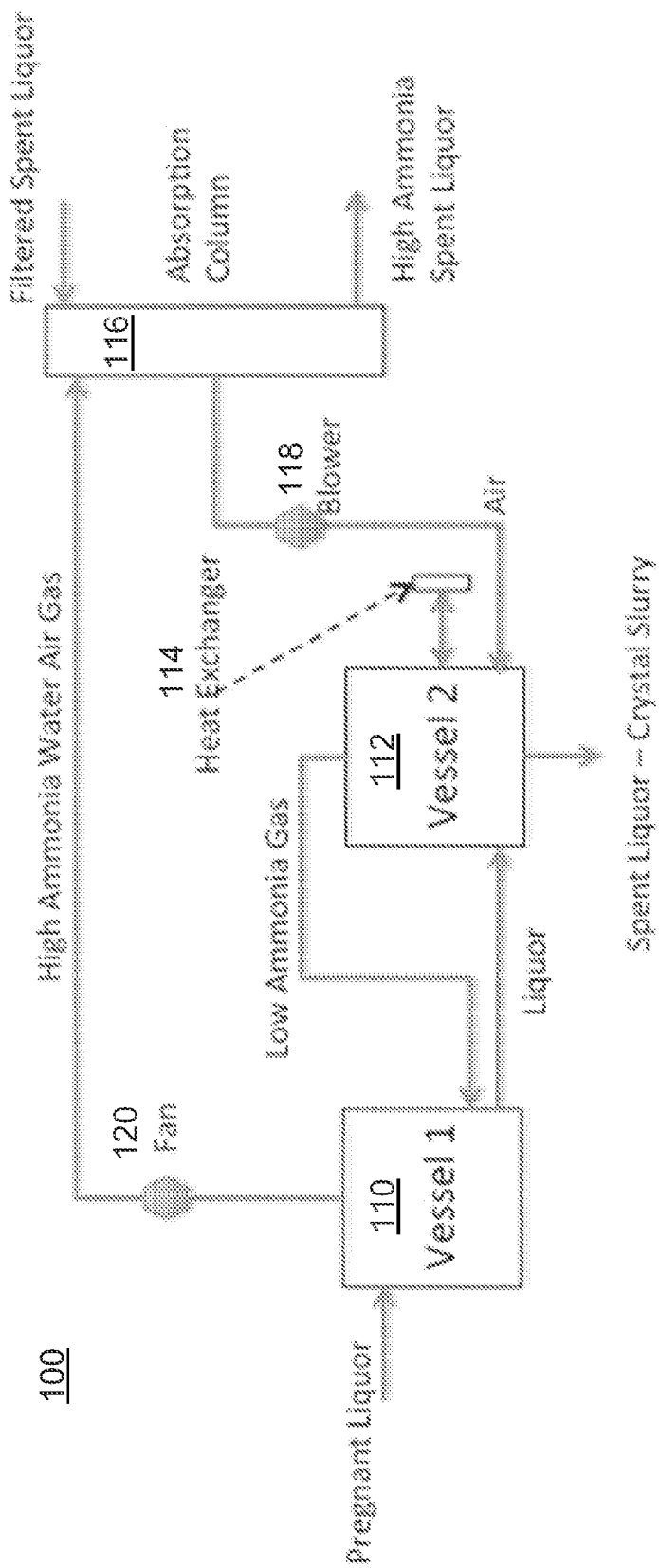
FIG. 2 is a general flow diagram showing the ammonia stripping process of one preferred embodiment of the process according to the present invention.

In some process routes, the zinc rich pregnant liquor is fed into a two step air stripping system 100, such as the system 100 illustrated in FIG. 2.

In this stripping system, two strip vessels, 110, 112 are used in which air is passed through the zinc rich pregnant liquor to assist with the ammonia gas removal whilst at the same time the solution is continually heated. Heating may be achieved using an internal or more preferably an external heat exchanger 114 where a hot liquid is used to provide heat to the pregnant liquor. The air-water-gas mixture that comes from the pregnant liquor is then passed through an absorption column 116 where the ammonia and water are absorbed back into the liquor. The resulting scrubbed air stream contains only small amounts of water and ammonia, and therefore can be recycled back into the strip vessels 110, 112. The system 100 is operated as a closed loop arrangement to avoid the need for the all of the ammonia to be removed, and then be discharged.

Both water and ammonia can be removed as a vapour in a two phase water-ammonia system. The relative amounts of water and ammonia removed is dependent on the concentrations, overall solution pH and temperature. The strip gas usually contains more water than ammonia and the water fraction of the strip gas increases as the ammonia level in the liquor being stripped decreases. As can be appreciated, considerable energy is thus required to remove ammonia from the liquor when the ammonia level in the liquor decreases because the amount of water evaporated becomes large. The last part of the ammonia removed can be in a gas with the ratio of ammonia to water being as low as 1:15 or even 1:20, which requires a large amount of energy for every tonne of ammonia removed.

In the process of the present invention, the stripped liquor is therefore stripped of ammonia to a final $NH_3$ concentration of between 7 and 30 g/L $H_2O$ and preferably has a pH greater than 7. The applicant considers that the energy requirement to reduce the final $NH_3$ concentration to lower than this range (and to have a solution pH of less than 7) would be uneconomical, due to the large amount of water that is needed to be evaporated to remove ammonia content.

Energy efficiency is increased in the stripping system 100 illustrated in FIG. 2 by using a plurality of strip vessels/stages 110, 112. The system includes heat recovery between the stages 110, 112 by passing the vapour from one vessel 112 into the next vessel 110 to provide heating. In this system 100, the ammonia ultimately removed from the system all comes from the high ammonia concentration first strip stage vessel 110 with the lower ammonia gases from the second strip vessel 112 being used to transfer heat between the vessels 110, 112.

In this design the high zinc, high ammonia pregnant liquor is continuously fed into strip-vessel 1 (110). The air-ammonia-water off gas from strip vessel 2 (112) is also fed into this vessel 112 and provides heat to keep the liquor at boiling or near boiling point to facilitate the removal of ammonia gas. The gas coming off this vessel 112 has a relatively high ammonia-water ratio (typically around 1:6). This gas passes to an absorption column 116 to recover the ammonia and water into spent liquor which is recycled from strip vessel 2

(112) after filtration to remove crystals and cooling to increase the ability to take up ammonia.

Some crystals form in strip vessel 1 (110) and are transfer into the strip vessel 2 (112) along with the excess liquor coming into the system from the pregnant liquor and the water in the heating gas. The liquor in vessel 2 (112) is continually heated by passing it through an external heat exchanger 114 where heat is passed into the liquor from a higher temperature liquor typically heated using a gas or oil fired boiler system (not illustrated). Air is also injected into this liquor to assist in boiling off ammonia and water in a gas mix with a low ammonia:water ratio (typically 1:15). The gas is fed into vessel 1 (110) to provide heat. The liquor is depleted in ammonia causing zinc to precipitate and the vessel holds a slurry of zinc and ammonia depleted liquor and ammonia free crystals.

This slurry is continually removed from strip vessel 2 (112) and cooled sufficient to allow filtration using conventional filtration equipment. It should be appreciated that the cooling conditions are not critical to the crystallisation as the zinc solubility is almost independent of the temperature and is controlled by the ammonia concentration.

Strip vessel 2 (112) is preferably operated under a small positive pressure sufficient to drive the gas from this vessel 112 into strip vessel 1 (110) and overcome the pressure exerted by the depth of the liquid. This pressure can be applied through using a blower system 118 to drive the air from the outlet of the ammonia absorption column 116 into this vessel 112. The gas from vessel 1 (110) is drawn into a low pressure high flow fan 120 which forces it into the absorption column 116 for collection of the ammonia. This design avoids the need for compressors to provide high pressure and also avoids the need for blowers or compressors to handle the high volume, high temperature water-ammonia-air gas mix from the vessels 110, 112. The air only represents a small portion of the gas with the water vapour being the major component.

In another embodiment, the heated pregnant liquor can be fed into a flash vessel (not illustrated) to flash off a mixed ammonia-water vapour stream leaving a supersaturated zinc liquor.

The resulting stripped liquor has a $NH_3$ concentration of between 7 and 30 g/L $H_2O$ and a pH greater than 7. The resulting stripped liquor pH and $NH_3$ concentration create the appropriate equilibrium conditions within that liquor to precipitate desirable basic zinc compound or mixture of compounds.

In one embodiment, part or all of the ammonia-water air vapour mixture from the stripping stage can be fed to a stripping column to take out a low ammonia water stream and ammonia vapour which is captured in a suitable scrubber. The water stream preferably has a low ammonia content and is therefore suitable for use in subsequent washing steps and vapour capturing steps, such as a zinc chloride vapour capture step described below. The ammonia vapour is cooled and condensed, or is contacted with aqueous liquor using a wet scrubber and dissolved into the liquor for recycle to the leach. The aqueous liquor used can be the filtrate from the precipitation stage but other streams from the process could also be used.

In another embodiment all of the ammonia-water air vapour mix is fed into an absorption column and contacted with cooled aqueous liquor, which is preferably the zinc and ammonia depleted liquor from the ammonia stripping with the crystals removed by filtration and/or settling, such that the majority of the ammonia and water are absorbed into the liquid leaving an air stream with low ammonia and water content for recycle into the ammonia stripping circuit.

Following the process step in FIG. 1, the supersaturated zinc liquor is passed into a crystallisation stage. In some embodiments, the crystallisation stage may be conducted in situ within the stripping vessels. One example is in the two stage strip system 100 shown in FIG. 2, in which the crystals are substantially formed in strip vessel 2 (112). In other embodiments, the supersaturated zinc liquor may be fed into a separate crystallisation vessel or vessels for example an agitated tank in which the liquor has an extended residence to allow the crystals to form and grow. If desired, the liquor can be cooled using a heat exchanger before entering the crystallisation tank and additional cooling can be provided in the tank. The resulting crystals are filtered on a conventional filter press, washed in a water or water-ammonia stream (produced from the stripping stage), and then discharged onto a belt conveyer.

The crystals are typically predominantly zinc hydroxy chloride ($Zn_5(OH)_8Cl_2.H_2O$), and zinc hydroxide ($Zn(OH)_2$) with, in some cases, an amount of zinc oxide (ZnO). The crystals typically have ~5 to 14% Cl with little or no ZDC content. The spent liquor from the filter press is substantially recycled to the second stage of the two stage leach. In this recycling step, the spent liquor can be used as a medium capture in the scrubber which follows the stripping column. The spent liquor may also be used as a scrubbing medium following hot air stripping column from the bleed step described below. The wash water from the crystal filter can also be used in a subsequent process, in this case a $ZnCl_2$ capture medium to capture $ZnCl_2$ volatilised during the roasting stage. It can also be used as make up water for the process.

The crystals are then fed to a recovery process which can proceed along various different process steps to convert the crystals into a low chloride zinc oxide product. As shown by the solid and dashed process lines in FIG. 1, the recovery process which may include a hydrolysis stage, a roasting stage or both. The exact recovering step(s) depends on the quality and purity of zinc oxide product desired.

In some process embodiments, the crystals can be hydrolysed to substantially convert any of the zinc hydroxy chloride content to at least one of zinc hydroxide or zinc oxide. Where the temperature of the hydrolysis water is hot, for example at a temperature of between 100 to 130° C., a hydrolysis product substantially comprising $Zn(OH)_2$ and/or ZnO zinc oxide can be produced with only a small amount of residual insoluble chloride remaining. In some cases, the hydrolysis product can include less than 0.4% insoluble chloride. This conversion route applies to crystals that are almost all zinc hydroxy chloride (~13% Cl) through to lower chloride crystals (<7%) that can be made directly from the previously described ammonia strip and crystallisation steps in controlled conditions.

It is noted that the conversion reaction can also proceed at lower temperatures. However, the applicant has found that the reaction is not as efficient in comparison to the higher temperature reaction and the chloride level remaining in the hydrolysis product is higher, being around 1% at 60° C. and 3% at 25° C. The total chloride present depends upon how much soluble chloride also remains and this is controlled by washing the crystals with suitable levels of water.

The reaction is not reversible and once formed the low chloride crystals do not increase in chloride content when they are cooled down, even in the presence of chloride containing liquor. The mixture can then be cooled and filtered at around 50 to 60° C. in conventional filtration equipment.

Quite high solids loadings (at least 40%) can be used and therefore the water additions are quite modest. Lower chloride crystals are therefore preferred as these require less water addition which improves the economics of the process as the added water has to be removed.

The chloride released into the water during hydrolysis is removed using reverse osmosis to recover clean water for re use. The chloride content is concentrated to chloride levels that are compatible with the liquor in the leaching and crystallisation stages allowing this stream to also be readily recycled in the process.

Following hydrolysis, the hydrolysis product can be dried at a temperature of <200° C. to produce a moderate grade zinc oxide product (>99% ZnO).

Where a high purity product is desired, this low chloride-low water product can be fed into a furnace. The furnace only has to remove a small amount of chloride, and no water, allowing for much higher throughput and a much simpler, smaller gas scrubbing system. The hydrolysed product can be roasted between 300 to 800° C. to produce zinc oxide. A lower temperature roast may be used if substantially all of the chloride content is removed in the hydrolysis step. The water from hydrolysis contains some zinc and therefore at least a portion of the water from the hydrolysis step is removed using reverse osmosis and the more concentrated liquor either recycled to the leach or treated to recover the zinc content. Where treatment is favoured, the recovered water can be treated with NaOH to precipitate any zinc content for recycle into the process. The NaOH treated water can be discharged from the process as a low concentration NaCl stream. This helps maintain the chloride balance in the circuit but has an added cost in NaOH use. If all the chloride is not removed by hydrolysis, final chloride traces in the precipitate can be removed by roasting the hydrolysed zinc containing precipitate at temperatures between 600 to 900° C.

In other process embodiments, the crystals are directly roasted to convert the intermediate precipitate into ZnO.

In one embodiment, the crystals are heated to a temperature of between 300 to 500° C. This roasting step decomposes the chloride compounds into ZnO and $ZnCl_2$. The soluble chloride compounds (mainly $ZnCl_2$) are then substantially removed in the aqueous leach to produce a leached solid. Any traces of chloride left can then be removed through further, preferably higher temperature roasting step, such as between 300 to 900° C. This step also converts the Zn containing compounds in the leached solids to ZnO. The double roasting regime enables less water to be used to remove the chloride content in comparison to the previous recovery option as $ZnCl_2$ is extremely soluble.

In another process embodiment, the crystals can be heated in a steam atmosphere at around a temperature of between 350 to 500° C. This process step would likely be undertaken at moderate pressure, of 1 to 5 bar. This process aims to decompose the zinc hydroxy chloride into ZnO and $ZnCl_2$ and to hydrolyse the $ZnCl_2$ in situ to convert it to ZnO. Any chloride content can be removed as HCl.

In another process embodiment, the crystals are directly roasted in a furnace at a temperature of between 600 to 900° C. Any volatilised $ZnCl_2$ is captured and recycled. Roasting between these temperatures substantially converts the product to zinc oxide. Furthermore, any chloride content of the zinc containing precipitate is volatised at this temperature to predominantly $ZnCl_2$, thereby giving a low chloride high purity product. Some traces of HCl may also be given off early in the roast through part reaction of the $ZnCl_2$ and $H_2O$ vapour. While higher temperatures speed up the volatilization, the final roasting temperature depends mainly on the economics at any specific installation. It should however be appreciated that removal of chlorides to <0.4% Cl in the end product typically involves roasting the zinc containing precipitate to temperatures in the order of 500 to 800° C. Furthermore, removal of chlorides to <0.2% Cl in the end product typically involves roasting the zinc containing precipitate to temperatures in the order of 600 to 800° C. even with prior treatment.

Low ammonia zinc containing precipitate is well suited to roasting as the main chloride containing compound zinc hydroxy chloride ($Zn_5(OH)_8Cl_2 \cdot H_2O$) decomposes to a mixture of ZnO (the major fraction) and $ZnCl_2$ (the minor fraction). The ZnO remains as a solid while the $ZnCl_2$ volatilises off at elevated temperatures.

The volatilised $ZnCl_2$ can be readily captured from the gas stream in a wet scrubber using an aqueous medium for recycle back to the leach. Such a $ZnCl_2$ capture stream can run in a continual recycle loop such that the composition reaches the target for leach (estimated at ~200 g/l $ZnCl_2$). This high concentration $ZnCl_2$ solution can then be recycled back into the process and/or treated to recover special grades of ZnO product. Most commonly, the $ZnCl_2$ stream will be returned to the crystallisation stage but in some cases there may be advantages in returning it directly to the leach circuit. Water from the ammonia stripping column directly and via the crystal filter wash can be added to retain the concentration and corresponding volume will be recycled into the process.

This high $ZnCl_2$ stream can also be used to make specialty grade ZnO products by precipitating ZnO and/or $Zn(OH)_2$ with high purity and controlled particle size and morphology by adding NaOH or similar base to the liquor in a controlled manner. This high $ZnCl_2$ liquor is particularly attractive as it has very high purity.

In another embodiment the $ZnCl_2$ vapour is not scrubbed with aqueous solution but is condensed to form high purity anhydrous $ZnCl_2$ which can be recovered and sold separately as a product.

In each of the roasting embodiments, a substantially pure zinc oxide product is produced.

The process shown in FIG. 1 is largely closed with no outlet for soluble impurities. A bleed stream can be used to control the build up of impurities such as sodium, potassium and chloride which arises from their content in the EAF dust. The level of bleed largely depends on the concentrations of sodium, calcium, potassium and chloride in the EAF dust. As shown in FIG. 1, the bleed system can comprise extraction of <10% of the filtrate from the filter stage following crystallisation and treatment of part of this extracted content with NaOH to raise the pH and precipitate the Zn present as $Zn(OH)_2$. This allows any ammonia content to be removed using a hot air stripping column leaving a potassium chloride stream for discharge. Hot air for this stripping process can be supplied indirectly from hot flue gases from the furnace used in the roasting step. The recovered ammonia can be scrubbed from the gas into spent liquor, whilst the $Zn(OH)_2$ sludge will be recycled to stage 1 of the two stage leach. Alternatively, KOH can be used for neutralizing the extracted content, resulting in a KCl product which can be sold.

Overall, the main reagent addition is NaOH for treating the bleed stream to recover ammonia and zinc while producing a suitable discharge stream. The tonnage of NaOH will depend mainly on the level of the impurities such as sodium and chloride in the dust but is likely to be of the order of 50 to 100 kg/t ZnO. Some ammonia may also be required to balance physical losses.

In another embodiment the chloride and high fractions of the other problem impurities can be removed by leaching them out using water before the EAF dust or other oxide source is subjected to the ammonium chloride-ammonia leach. Thus, while not shown in FIG. 1, the zinc containing material can undergo a preliminary leaching stage prior to the first lixiviant leaching stage where the zinc containing material is leached with water. In that embodiment, the dust is leached with water in a separate vessel and then the solids are removed from the water using a thickener or more commonly a filter. The dust is then treated through the typical flowsheet while the water containing the chloride and substantial amounts of the sodium, potassium and calcium is treated to ensure precipitation of small amounts of metals such as lead and zinc and subsequently discharged. The treatment used commonly involves adjusting the pH through additions of HCl and/or NaOH but other acids and bases can be used. This may remove the need for the bleed treatment altogether or if not fully successful significantly reduces the amount of liquor needing treatment to <5% and therefore the cost of reagents and energy needed.

The product from this process is a high grade ZnO which can either be sold directly for use or can be redissolved in sulphuric acid and electrolysed to give metallic zinc using conventional technology. The high purity ZnO is ideal for this electrolysis as no further purification is required. In some cases it may be economically preferable to make a lower purity ZnO using this ammonia based leach process and carry out the final purification using known technology from the acidic zinc sulphate solution. In that cases zinc dust cementation can be used to remove metallic impurities and known technologies such as solvent extraction and/or cuprous chloride precipitation can be used to remove chlorides.

The Particulate Material(s) of the Examples

The leach examples hereafter have treated EAF dust with the content of Table 1.

TABLE 1

|  | wt % |
|---|---|
| Zn | 34.0 |
| Cl | 3.6 |
| Pt | 1.1 |
| Ca | 11.9 |
| Cu | 0.2 |
| Cd | 0.04 |
| Pb | 2.1 |
| Mn | 1.2 |
| Fe | 16.0 |
| Na | 3.7 |

THE LEACHING EXAMPLES

Example 1

Leach tests were carried out on a sample of EAF dust from a New Zealand steel works. The dust was leached in a lixiviant containing 150 g $NH_3$/kg of water & 125 g $NH_3Cl$/kg of water with 17.5 wt % solids added to the lixiviant. The dust initially had 43% Zn present.

The results of the leach are provided in Table 2. After the first leach the liquor was separated from the residue and the residue was analysed and found to contain only 21.3% zinc indicating over half of the zinc had been leached from the dust. Apart of this residue was subjected to a second leach using fresh lixiviant of the same composition and this second extraction reduced the zinc to 16.8% in the residue showing the advantage of using the two stage leach. A third leach on the residue was performed to determine if a 3-stage leach design is of value for this particular dust but with this third leach the zinc in residue only decreased to 15.1% suggesting that for this dust the added cost of a 3rd leach stage may not be warranted.

TABLE 2

Leach Results

| Residue Sample | Metal/Element (%) in Residue | | | | | | | |
|---|---|---|---|---|---|---|---|---|
|  | Zinc | Iron | Chloride | Copper | Cadmium | Lead | Manganese | Calcium |
| Single Leach (Pilot Plant) | 21.3 | 17.8 | 4.5 | 0.2 | 0.016 | 4.6 | 2.4 | 3.1 |
| 2-stage Leach (Pilot, then Lab) | 16.8 | 19.9 | 1.3 | 0.2 | 0.007 | 5.5 | 2.8 | 2.9 |
| 3-Stage Leach (Pilot, then 2 × lab) | 15.1 | 22.5 | 0.4 | 0.2 | 0.005 | 5.9 | 3.0 | 2.6 |

Figure 3:
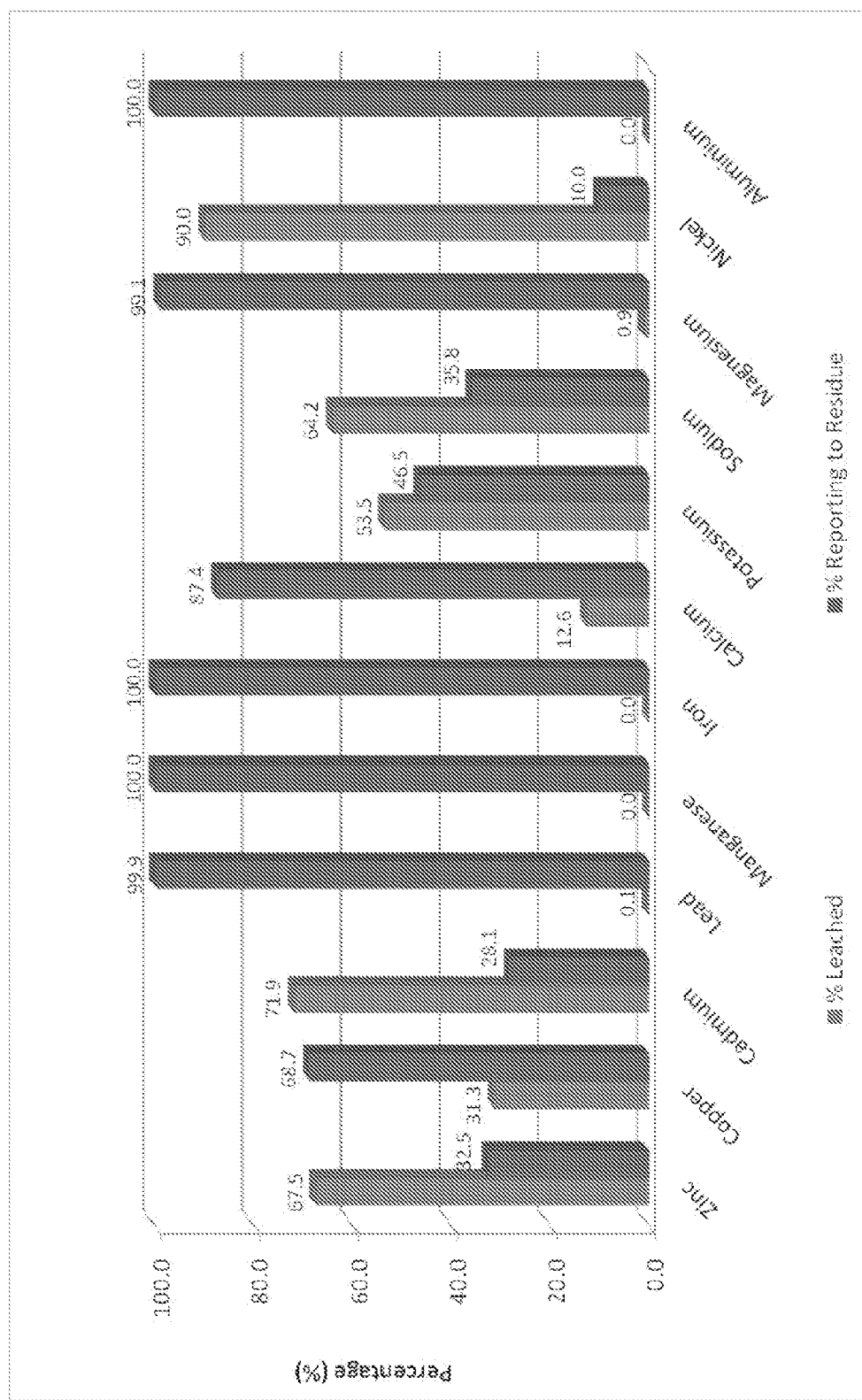
FIG. 3 is a graph of metals extraction versus remaining in residue after a leach step of a process of the present invention.

FIG. 3 provides a visual comparison of the metal values that are extracted in the leachate versus the amount remaining in residue.

Figure 4:
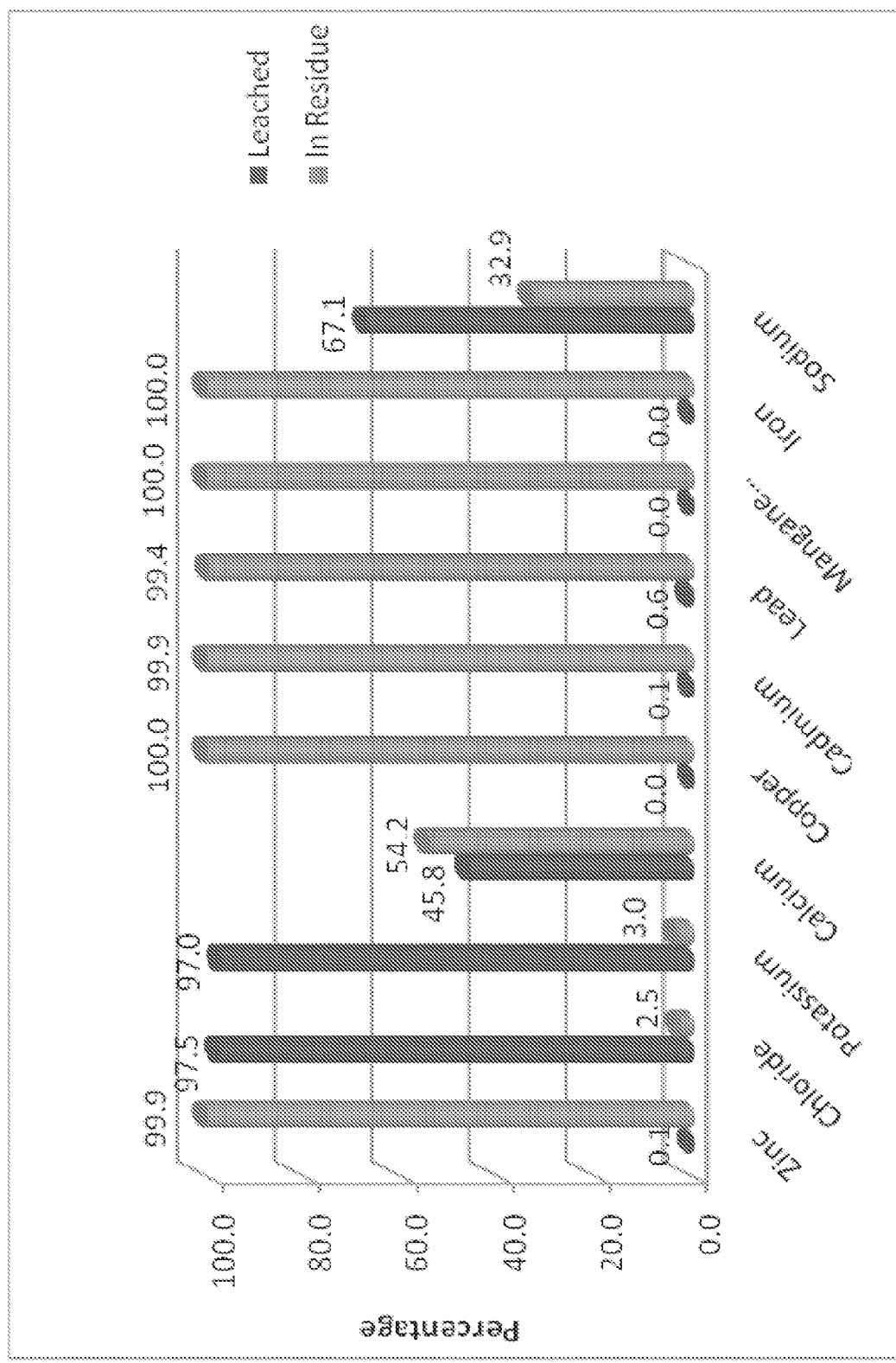
FIG. 4 is a graphical representation soluble impurity extraction versus content reporting to leach for the water wash process.

FIG. 4 is a graphical representation soluble impurity extraction versus content reporting to leach for a water wash process on the EAF dust.

Example 2

A Leach test was carried out on an EAF dust sample provided from a Port Pirie, South Australia source having a generally similar composition to the EAF dust listed in Table 1. In this case, the dust initially contained 32.7% zinc. The leach was performed in lixiviant containing 50 g/kg of water ammonia and 50 g/kg of water ammonium chloride with 10% w/v solids loading in a single stage leach to allow for full maximum zinc extraction.

The single stage leach liquor contained 22.3 g/L zinc, with the residue containing 16.9% zinc corresponding to a zinc extraction efficiency of 67.5%.

Additional Work with this particular EAF dust has shown the liquor saturation limit to be 34.7 g/L zinc. A two-stage leaching process as described above in relation to FIG. 2 has been found to allow for both liquor saturation and maximum zinc extraction to be achieved concurrently.

Zinc Solubility in $NH_3$/$NH_4Cl$ Leach

The solubility of zinc in a lixiviant comprising 75 g $NH_4Cl$/kg $H_2O$ at 23, 50 & 70° C. at $NH_3$ concentrations between 0 and 75 g/kg $H_2O$ was investigated. The results of these tests are shown in Table 3.

TABLE 3

$NH_3$/$NH_4Cl$ Leach

| $NH_3$ (g/kg of $H_2O$) | Zinc (g/L) at temperatures | | |
|---|---|---|---|
|  | 23° C. | 50° C. | 70° C. |
| 0 | 2.5 | 5.7 | 6.7 |
| 10 | 17.0 | 18.7 | 18.5 |

TABLE 3-continued

| NH$_3$/NH$_4$Cl Leach | | | |
|---|---|---|---|
| NH$_3$ (g/kg of H$_2$O) | Zinc (g/L) at temperatures | | |
| | 23° C. | 50° C. | 70° C. |
| 20 | 29.9 | 29.0 | 29.8 |
| 30 | 38.5 | 38.8 | 37.2 |
| 50 | 45.2 | 43.6 | 42.9 |
| 75 | 52.4 | 50.2 | 49.1 |

Figure 5:
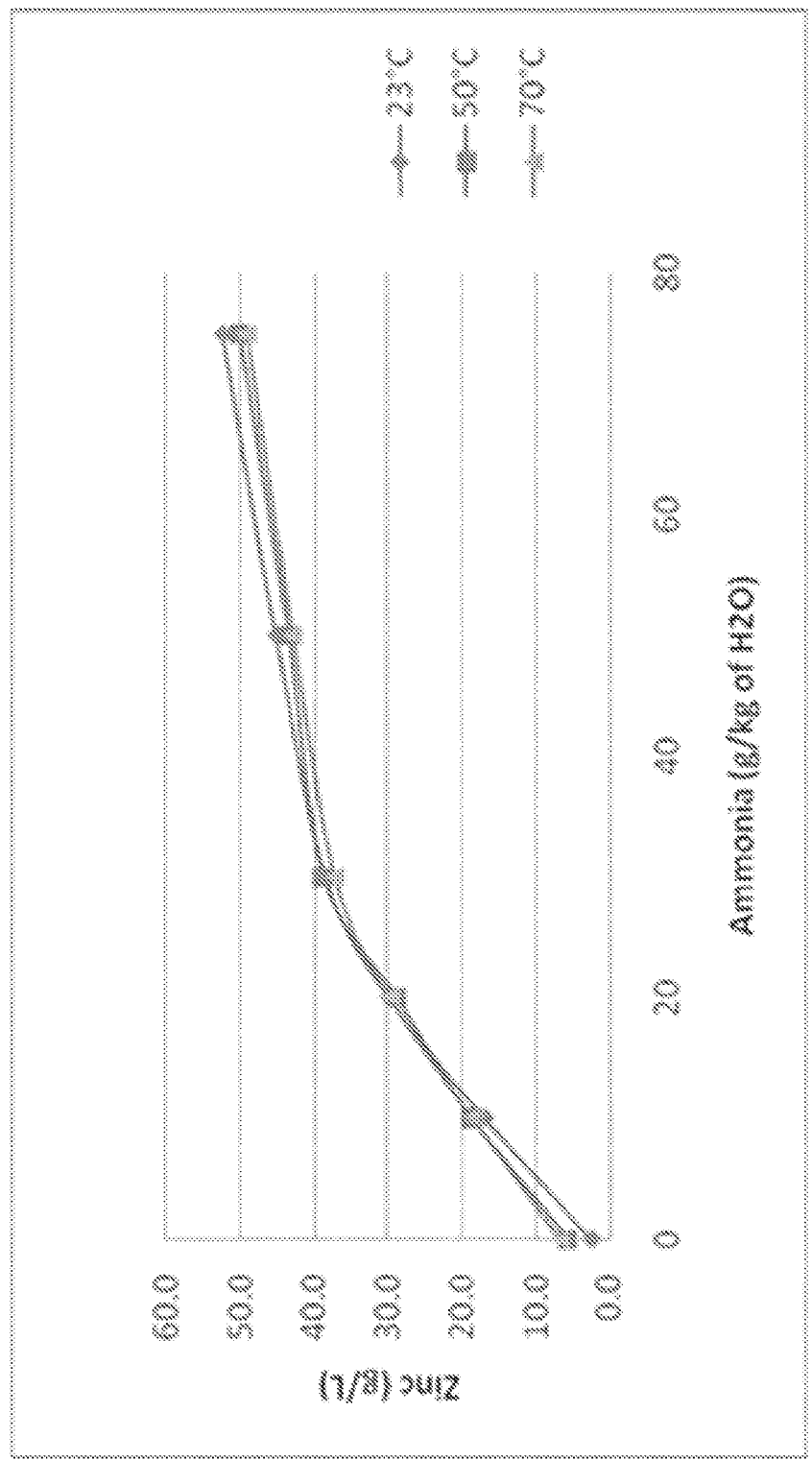
FIG. 5 provides graphical results of zinc solubility in a $NH_3/NH_4Cl$ leach test.

FIG. 5 presents these results in graphical form. As can be observed, there is not a large Zn solubility difference with temperature. The main difference is based on NH$_3$ difference which indicates that Zn will precipitate (form crystals) through the stripping process.

STRIP EXAMPLES

Example 1

A leach liquor with composition 100 g/l NH$_3$, 250 g/l NH$_4$Cl and 59.7% Zn was stripped of the majority of the ammonia by heating to near boiling in an open flask. The liquor was then held in this open flask and allowed to cool slightly while a zinc precipitate formed. The precipitate was separated from the liquor and analysed for zinc and chlorine content. The crystals had 39.2% Zn and 43.1% Cl indicating that they were predominantly ZDC.

Example 2

A leach liquor with composition 50 g/L NH$_3$, 75 g/L NH$_4$Cl and 46.5 g/L zinc was stripped of the ammonia by heating to near boiling in an open vessel. The solution was then left to sit without further heating while crystals formed within the liquor. The crystals were filtered off and analysed. They were found to contain 62.5% Zn and 12.7% Cl indicating that it was predominantly zinc hydroxy chloride. The filtrate removed from the crystals contained 11.6 g/L Zn and 11.4 g/L NH$_3$ confirming that the majority of the NH$_3$ had been removed and this caused the precipitation of the majority of the zinc.

Example 3

A leach liquor solution containing ~50 g/l NH$_3$ in liquor containing 50 g/l NH$_4$Cl and 34 g/l Zn was stripped of the ammonia by air injection stripping process according to the stripping process shown in FIG. 2. The leach liquor solution is heated to keep the temperature around 90° C.

Figure 6:
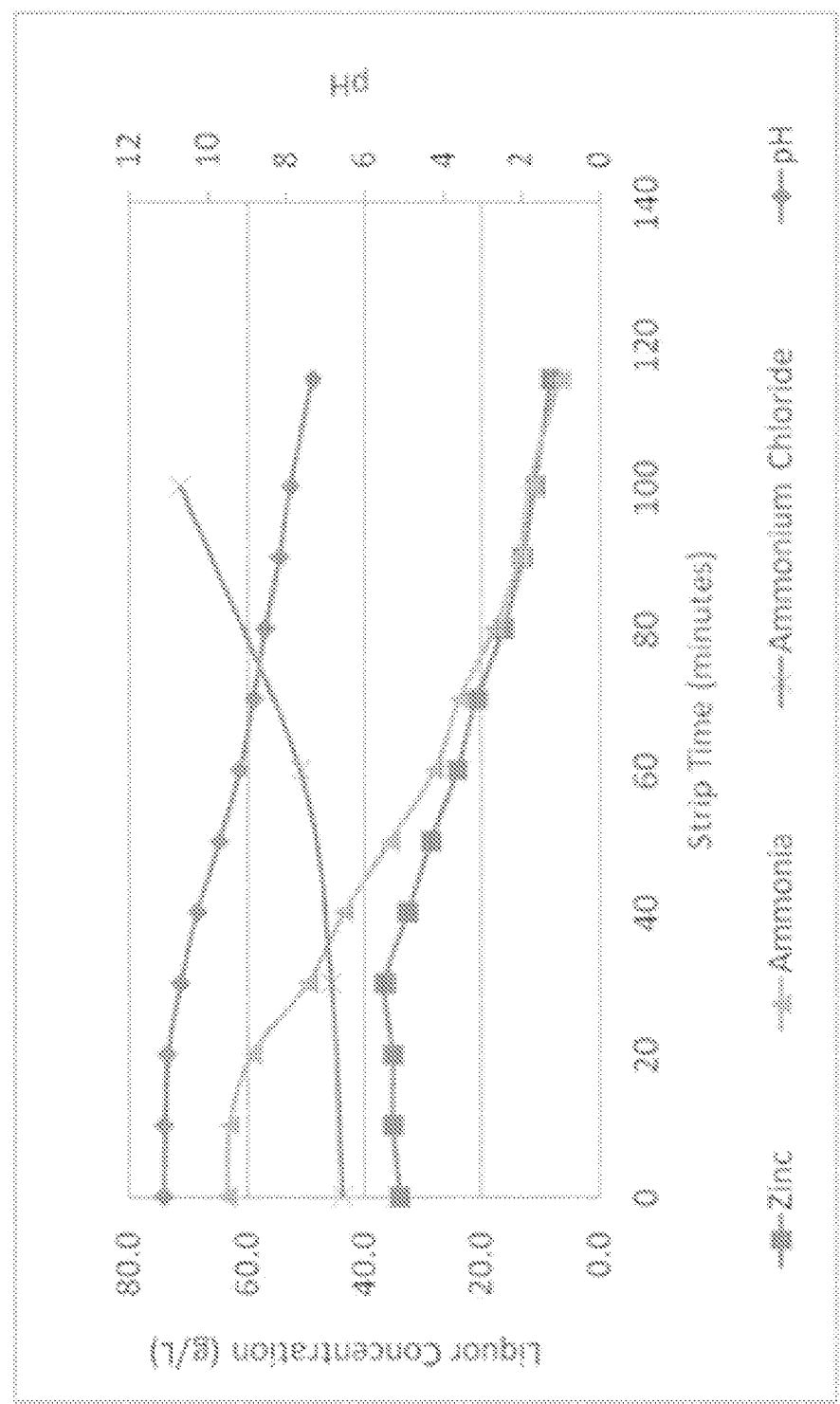
FIG. 6 provides graphical results of ammonia stripping tests illustrating the change in pH and liquor concentration over time.

FIG. 6 shows the change in pH, ammonia concentration, ammonium chloride concentration and zinc concentration in solution as the ammonia is stripped from the solution. The solution has an initial pH of around 11 which decreases to ~7.35 as the NH$_3$ decreases to 6.8 g/l.

Figure 7:
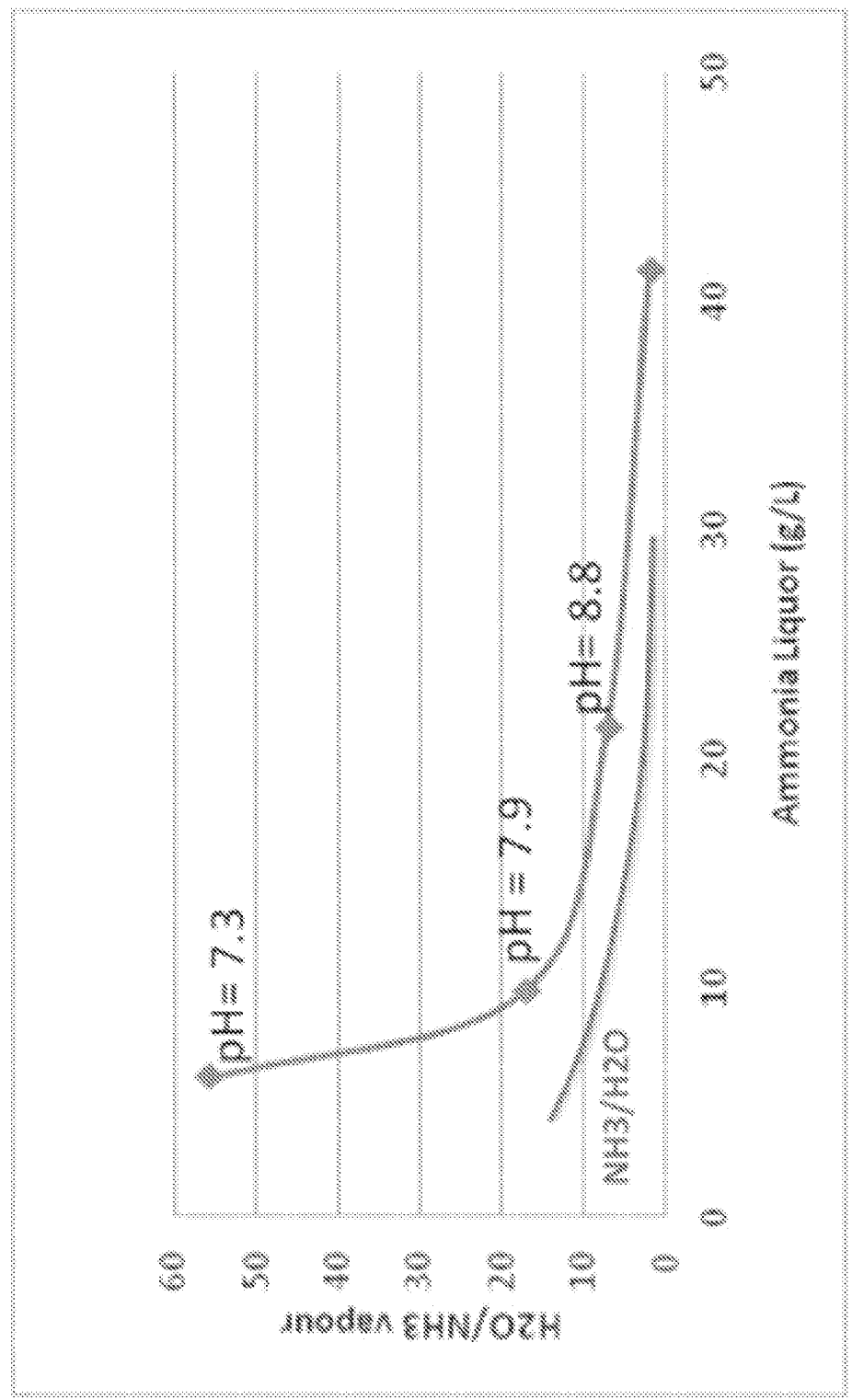
FIG. 7 graphical results of ammonia stripping tests illustrating the change in the ratio of water to ammonia in the vapour coming off the solution as the $NH_3$ is stripped using a combination of air and heat.
Figure 8:
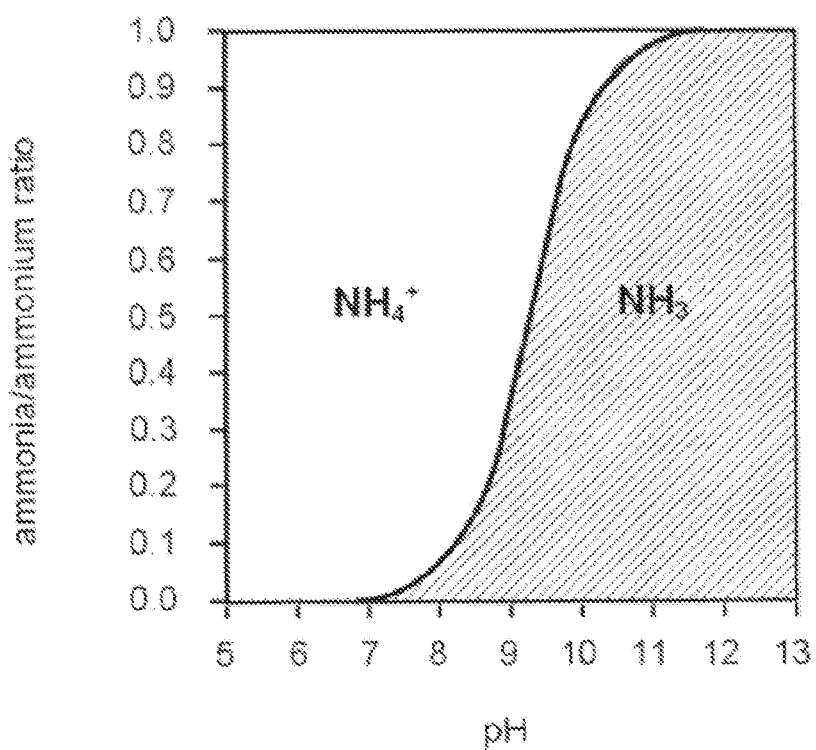
FIG. 8 shows the ratio of $NH_3/NH_4^+$ in $NH_3$ solutions as a function of pH.

FIG. 7 shows the change in the ratio of water to ammonia in the vapour coming off the solution as the NH$_3$ is stripped using a combination of air and heat. The ratio of water to ammonia in the vapour increases very rapidly as the pH decreases below 7.9, indicating that it is increasingly difficult to remove NH$_3$. This is confirmed when plotting the ratio of NH$_3$/NH$_4^+$ in NH$_3$ solutions as a function of pH, as shown in FIG. 8. This plot confirms that removing NH$_3$ from liquor by stripping at pH below 7.3 is difficult as there is almost no free NH$_3$ available in the liquor for removal.

ROAST EXAMPLE

Example 1

Four samples of zinc crystals of varying composition were prepared and roasted in a muffle furnace to establish their behaviour. The high chloride sample (40.31%) lost ~90% of its mass consistent with the crystals being ZDC which decomposes by volatilising to NH$_3$ and ZnCl$_2$ rather than forming ZnO. The lower chloride samples predominantly being a mix of zinc hydroxy chloride and zinc hydroxide lost far less mass consistent with the main reaction being the loss of H$_2$O from the crystals. Some ZnCl$_2$ was lost for the higher chloride crystals which had much higher mass loss than the crystals which had only 2.31% Cl. All of these samples had low chloride levels after roasting and easily met the target of <0.2% Cl needed for the planned market for this material. The results of this roasting process are provided in Table 4.

TABLE 4

| Roasting Results | | | | | |
|---|---|---|---|---|---|
| mass ZnO•H2O before roasting (g) | mass ZnO after roasting (g) | mass lost through roast (g) | mass lost through roast (g) | Chloride Content in solid BEFORE roast (% w/w) | Chloride Content in solid AFTER roast (% w/w) |
| 9.971 | 0.921 | 9.05 | 90.76 | 40.31% | 0.04% |
| 9.844 | 6.273 | 3.571 | 36.28 | 17.84% | 0.06% |
| 10.552 | 6.59 | 3.962 | 37.55 | 9.61% | 0.00% |
| 11.315 | 9.556 | 1.759 | 15.55 | 7.311 | 0.00% |

Roasting carried out for 2 hours at 800 C. in a muffle furnace.

Water Wash of NZ Dust

Figure 9:
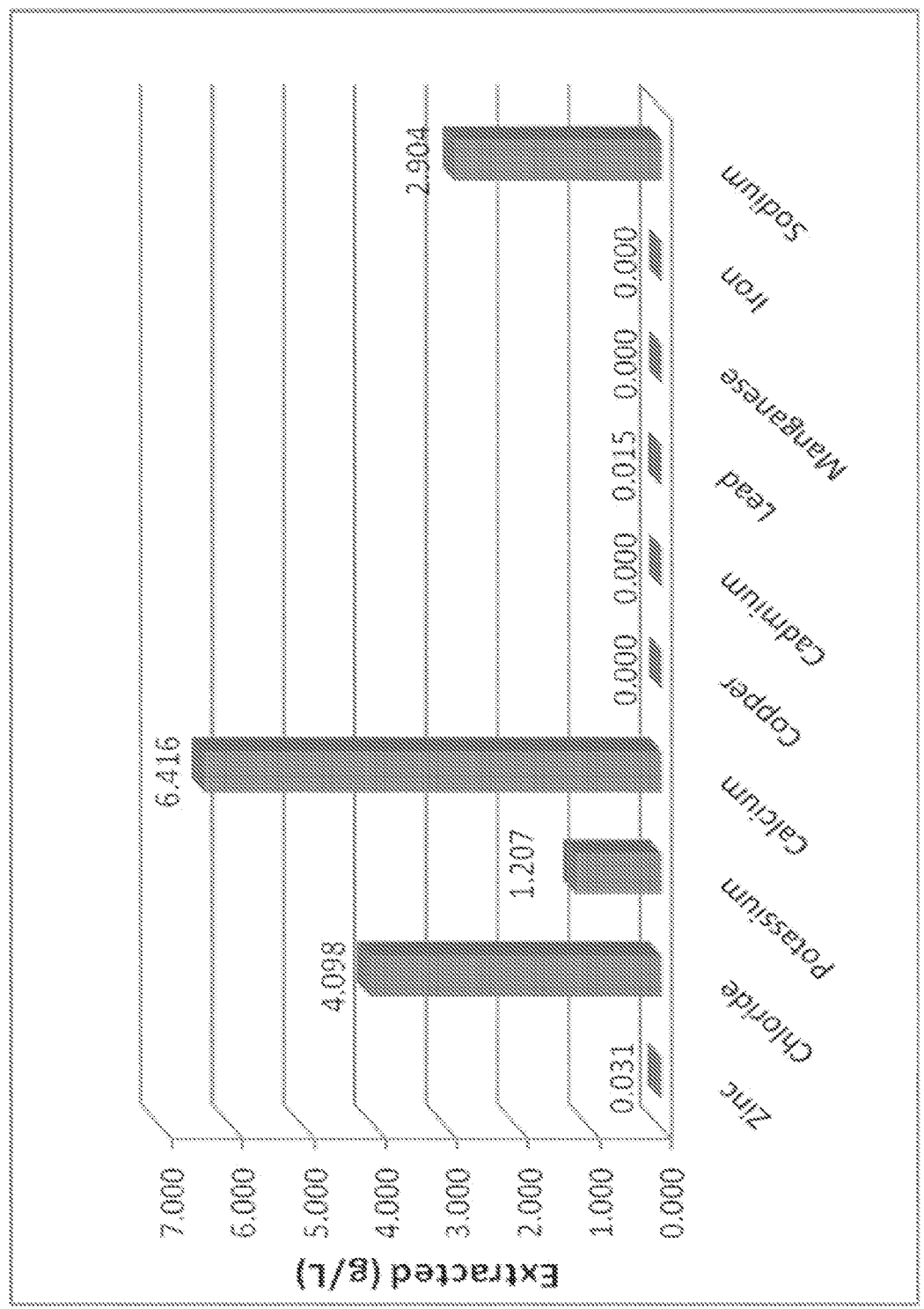
FIG. 9 provides graphical results of water leach concentrations of one form of zinc containing dust that can be used in the process of the present invention.

New Zealand dust washed with water (18% solid loading) with vigorous stirring for 40 minutes. Sample filtered and residue and liquid analysed by AAS for various elements. The results of this water leach are shown in FIG. 9.

HYDROLYSIS

Example 1

The zinc containing precipitate crystals resulting from leach example 2 were reacted with water at various elevated temperatures to allow the chloride containing crystals to undergo hydrolysis to convert the crystals to Zn(OH)$_2$ and/or ZnO with removal of the chloride ions into solution.

Figure 10:
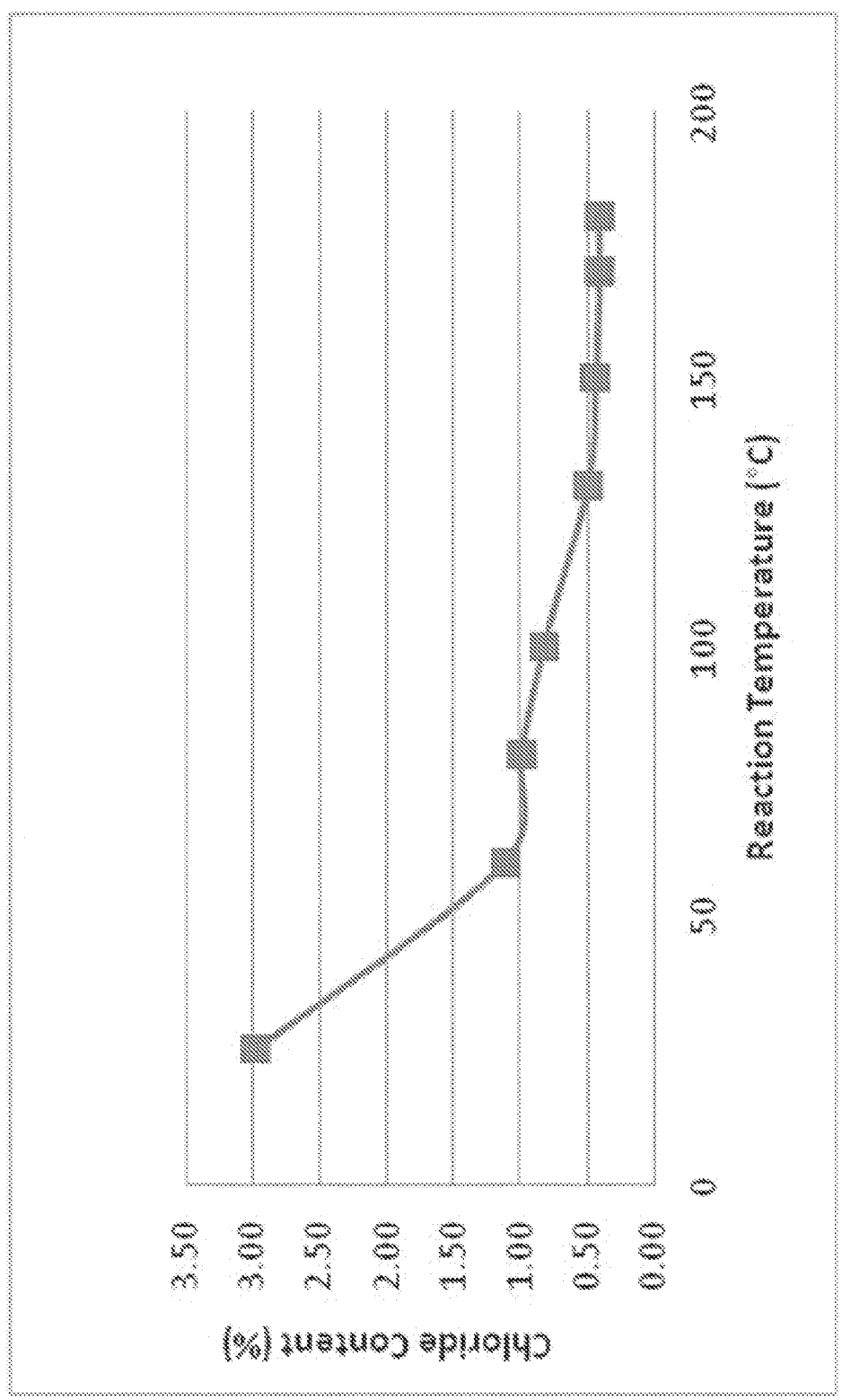
FIG. 10 provides graphical results of the residual chloride content of zinc containing crystals after hydrolysis versus the reaction temperature of hydrolysis.

FIG. 10 shows the residual chloride content of zinc containing crystals precipitated by ammonia stripping and then hydrolysed in water at varying temperatures to reduce the chloride level from the initial 6.4%. The plot indicates that a low chloride Zn crystal product can be produced by hydrolysis of the zinc containing precipitate from the stripping stage, if hydrolysis is conducted at an elevated temperature—for example greater than 100° C. A run of particular interest is where the crystal feed containing 6.4% chloride was hydrolysed at 130° C. for 4 hours at 20% solids (w/v). The chloride content was significantly reduced to 0.50% through this hydrolysis process.

Oxidised Zinc Ores

Whilst the present invention has been described in relation to recovering zinc from Electric Arc Furnace dust ("EAF"), it should be appreciated that the process can be used to recover zinc from any number of zinc containing materials. For example, the process of the present invention can be used to recover a zinc content from various oxidised zinc ores, such as found at Beltana in Australian and Skorpion in Namibia (typical minerals are Willemite, Hemimorphite and Smithsonite).

Oxidised zinc ores are difficult to treat economically using conventional processing as they are often too low grade to treat directly in smelters but are difficult to treat hydrometallurgically in acid circuits because of the presence of silica and/or carbonates. The Applicant considers that the process of the present invention in which an oxidised ore is directly leached with an ammonia-ammonium chloride lixiviant and the zinc content is recovered as high grade zinc oxide is particularly suited to these ores and provides a much improved process.

The process used for these oxidised zinc ores is very similar to that described above for EAF Dust except that the ore generally requires grinding to a powder before leaching whereas the EAF dust is a very fine powder as produced. The oxidised zinc ore is leached to dissolve out the majority of the zinc and the solution filtered to give a pregnant liquor containing the majority of the zinc and a residue for disposal. The pregnant liquor is then processed in the same manner as is used for EAF Dust or any other zinc oxide source with the ammonia being stripped to lower the zinc solubility and precipitate substantially ammonia free crystals.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A process for recovering zinc from a zinc containing material, the process including the steps of:
   leaching the zinc containing material with an alkaline lixiviant comprising an aqueous mixture of $NH_3$ and $NH_4Cl$, or ionic equivalent, having a $NH_4Cl$ concentration of between about 10 g/L and about 150 g/L $H_2O$ and a $NH_3$ concentration of between 20 g/l $H_2O$ and 250 g/L $H_2O$, to produce a zinc containing leachate precipitate in the form of at least one of zinc hydroxide ($Zn(OH)_2$), zinc hydroxy chloride ($Zn_5(OH)_8Cl_2.H_2O$), zinc oxide (ZnO) or combination thereof;
   stripping ammonia from the leachate to produce a stripped liquor which includes a zinc containing precipitate, the stripped liquor having a $NH_3$ concentration of between 7 and 30 g/L $H_2O$; and
   recovering the zinc from the stripped liquor.

2. A process according to claim 1, wherein the lixiviant has a $NH_4Cl$ concentration of between 20 g/L $H_2O$ and 100 g/L $H_2O$.

3. A process according to claim 2, wherein the concentration of $NH_3$ in the lixiviant is between 20 and 150 g/L $H_2O$.

4. A process according to claim 3, wherein the $NH_3$ concentration after stripping is about 10 g/L $H_2O$.

5. A process according to claim 1, wherein the stripped liquor has a pH greater than 7.

6. A process according to claim 1, wherein the stripping step includes an air stripping process step.

7. A process according to claim 6, wherein the air stripping process step includes at least two stripping process stages, the air stream and zinc containing leachate to flowing through the stripping process stages in a counter current flow, and wherein the zinc containing leachate is continually heated in at least one of the strip process stages.

8. A process according to claim 1, wherein the major component of the zinc precipitated in the stripped liquor is zinc oxide or zinc hydroxy chloride.

9. A process according to claim 1, wherein the step of recovering the zinc produces a zinc depleted liquor which is directly recycled back to at least one of the leaching step or the ammonia strip step.

10. A process according to claim 1, wherein the step of recovering the zinc include the steps of:
    separating the zinc containing precipitate from the stripped liquor.

11. A process according to claim 10, wherein the step of recovering the zinc further includes at least one of the steps of:
    roasting the zinc containing precipitate to a temperature of between 600 to 900° C.; or
    hydrolysis of the zinc containing precipitate in water having a temperature of between 80 and 200° C.

12. A process according to claim 10, wherein the step of recovering the zinc includes the steps of:
    hydrolysis of the zinc containing precipitate in water having a temperature of between 80 and 200° C.; and
    drying the zinc precipitate at a temperature below 200° C.

13. A process according to claim 12, wherein the step of recovering the zinc further includes the steps of:
    recovering at least a portion of the water from the hydrolysis step; and
    concentrating this water to produce a concentrated liquor and recycling the concentrate to the leach step.

14. A process according to claim 13, further including the step of:
    treating the concentrated liquor with sodium hydroxide to precipitate any zinc content for recycle into the process.

15. A process according to claim 10, wherein the step of recovering the zinc further includes the steps of:
    a first roasting step in which the zinc containing precipitate is roasted at a temperature of between 300 to 500° C.; and
    a second roasting step in which the roasted solids are further roasted between 300 to 900° C.

16. A process according to claim 10, wherein the step of recovering the zinc further includes the step of:
    roasting the zinc containing precipitate in a steam atmosphere at a temperature of between 350 to 500° C.

17. A process according to claim 15, where the zinc containing precipitate is volatised in at least one of the roasting steps and further including at least one of the following:
  condensing the zinc containing precipitate and separating for sale as anhydrous $ZnCl_2$; or
  capturing the zinc containing precipitate into an aqueous liquor and recycling this liquor to a preceding process step.

18. A process according to claim 15, wherein after the first roasting step, the roasted zinc containing precipitate undergoes a leaching step with water to produce a leached solid.

19. A process according to claim 12, wherein the step of recovering the zinc further includes the steps of:
  roasting the hydrolysed zinc containing precipitate at a temperature of between 300 to 900° C.

\* \* \* \* \*